US012656838B2

(12) United States Patent
Chen

(10) Patent No.: US 12,656,838 B2
(45) Date of Patent: Jun. 16, 2026

(54) MULTILINK OPERATIONS ACROSS WIRELESS MODULES

(71) Applicant: Compex Systems Pte Ltd, Singapore (SG)

(72) Inventor: Mun Chen, Singapore (SG)

(73) Assignee: COMPEX SYSTEMS PTE LTD, Singapore (SG)

( * ) Notice: Subject to any disclaimer, the term of this patent is extended or adjusted under 35 U.S.C. 154(b) by 79 days.

(21) Appl. No.: 18/972,928

(22) Filed: Dec. 7, 2024

(65) Prior Publication Data

US 2026/0118924 A1 Apr. 30, 2026

Related U.S. Application Data

(60) Provisional application No. 63/712,281, filed on Oct. 25, 2024.

(51) Int. Cl.
*G06F 1/185* (2026.01)
(52) U.S. Cl.
CPC .................................... *G06F 1/185* (2013.01)
(58) Field of Classification Search
None
See application file for complete search history.

(56) References Cited

U.S. PATENT DOCUMENTS

| | | | |
|---|---|---|---|
| 11,073,873 B1 * | 7/2021 | Sover ...................... | G06F 1/185 |
| 2017/0371823 A1 * | 12/2017 | Pearson .............. | G06F 13/4282 |
| 2020/0065287 A1 * | 2/2020 | Grafe ...................... | G06F 1/186 |
| 2024/0201758 A1 * | 6/2024 | Wu ...................... | G06F 13/4282 |

FOREIGN PATENT DOCUMENTS

CN 223390796 U * 9/2025

* cited by examiner

*Primary Examiner* — Kenneth Bukowski
(74) *Attorney, Agent, or Firm* — Stetina Garred Brucker & Newboles

(57) ABSTRACT

A multilink operation wireless networking system has a plurality of wireless communications modules. Each of these modules have a circuit board with connector pins, a wireless communications integrated circuit with signal ports connected to the connector pins, multilink operation input ports and output ports, and multilink operation input interconnects and output interconnects connected to respective multilink operation input ports and output ports. There are also one or more multilink operation cables. A first one of the multilink operation cables is connected to one of the multilink operation output interconnects of a first one of the plurality of wireless communications modules, and to one of the multilink operation input interconnects of a second one of the plurality of wireless communications modules.

20 Claims, 8 Drawing Sheets

| FIG. 1A | FIG. 1B | FIG. 1C |
|---------|---------|---------|

10

26c-2    26c-2b    26c-2e    26c-2g    26c-2i    24c

| GND | DATA OUT | GND | GND | CLK OUT | GND | DATA IN | GND | CLK IN | GND | GND | GND |
|-----|----------|-----|-----|---------|-----|---------|-----|--------|-----|-----|-----|
| PIN 12 | PIN 14 | PIN 16 | PIN 18 | PIN 20 | PIN 22 | PIN 32 | PIN 34 | PIN 36 | PIN 38 | PIN 40 | PIN 70 |

26c-1   26c-1b     26c-1e    26c-1g    26c-1i

~16c     ~18c     ~20c     ~22c

WSI DATA OUT     WSI CLK OUT     WSI DATA IN     WSI CLK IN

~14c-1     ~14c-2     ~14c-3     ~14c-4

| GPIO 48 | GPIO 49 | GPIO 50 | GPIO 51 |
|---------|---------|---------|---------|
| PIN N2 | PIN P1 | PIN P2 | PIN P3 |

RADIO-3

12c

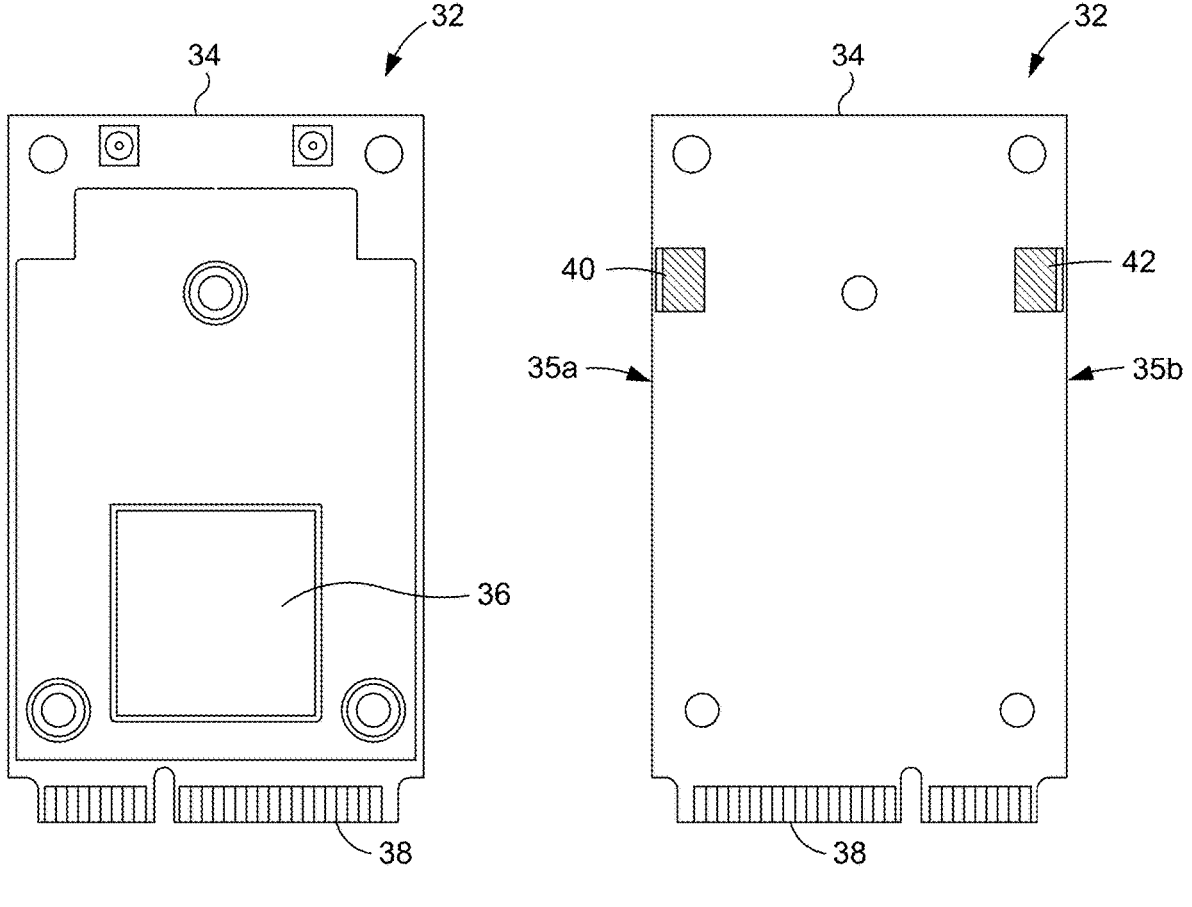
FIG. 2A                FIG. 2B

MULTILINK OPERATIONS ACROSS WIRELESS MODULES

CROSS-REFERENCE TO RELATED APPLICATIONS

This application relates to and claims the benefit of U.S. Provisional Application No. 63/712,281 filed Oct. 25, 2024 and entitled "A METHOD OF IMPLEMENTING MULTI-LINK OPERATIONS ACROSS WIRELESS MODULES ON CONVENTIONAL CPU PLATFORMS," the entire disclosure of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to wireless data communications, and more particularly to an implementation of multilink operations across wireless modules.

2. Related Art

Wireless local area networks (WLANs) are used to link together a variety of devices within a limited physical space such as an office building, a school, a restaurant, a café, a hotel, a home, and so on. These networks also serve as access modalities to the wider Internet through a gateway. Because the communications links are established wirelessly over radio waves, the user is able to move freely about the coverage area and not tied to a physical network connection. A typical deployment includes one or more wireless access points that, at its foundation, is a radio transceiver. An endpoint device such as a computer or a smartphone may establish a communications link with the access point with its own transceiver to send and receive data.

In order to implement the communications link, both the endpoint device and the access point both conform to a set of protocols that define the way in which the transmissions are carried out. One of the most common WLAN networking standards is the Institute of Electrical and Electronic Engineers (IEEE) 802.11 family, which defines the services and standards for the physical layer and the data link layer that is in turn comprised of the logical link sublayer and the media access control sublayer. Thus, Wi-Fi access points and endpoint devices alike send and receive information as data packets over radio waves at predetermined frequencies and modulation techniques. More commonly referred to as Wi-Fi, the earliest generation of the 802.11 standard was adopted in 1997, and advancements continue to this day.

Recently, networking devices conforming to the draft IEEE 802.11be standard, also designated as Wi-Fi 7, are becoming available on the market. Among the key advancements of the standard are 4096 Quadrature Amplitude Modulation (4 k-QAM), Multilink Operation (MLO), and improved Multiple Input Multiple Output (MIMO) features.

Multilink Operation involves the aggregation of throughout across multiple radio links at the different operating frequency bands of 2.5 GHz, 5 GHz, and 6 GHz. Data packets are transported through the least congested links via band-switching and load-balancing, thereby improving latency. A typical implementation involves multiple radio modules that are interconnected together, with each of the radio modules communicating with each other over single-ended synchronous high-speed interlinks in a ring configuration where the DATA and CLK (clock) signal output of a primary radio module is connected to the corresponding DATA and CLK inputs of a secondary radio module, and so forth, all the way to the end of the chain. The DATA and CLK signal outputs of the last radio module is, in turn, connected to the corresponding inputs of the first or primary radio module. These control signals are to be routed through impedance matched traces on the host board.

Conventionally, the radio modules are provided as M.2 E-key modules, so the DATA and CLK signals are mapped to specific pins of the E-key connector. Doing so, however, requires a custom host board printed circuit board design. Such conventional host boards do not support the MLO/Wireless Serial interface (WSI) traces so MLO between different radio modules are not possible. On host boards with miniPCIe or M.2 B or M key sockets, there are an insufficient number of pins to implement the MLO interconnection, even if they could be rerouted to support the MLO/WSI traces. Accordingly, there is a need in the art for enabling multilink operation in existing Wi-Fi 7 radio modules.

BRIEF SUMMARY

The embodiments of the present disclosure overcome current limitations of host boards that preclude the implementation of multilink operations in Wi-Fi 7 devices. A full feature set including MLO functionality may be made available to a wide spectrum of deployments across different computing platforms.

According to one embodiment, a wireless networking module for multilink operation may include a computer expansion board with connector pins in a predefined arrangement insertable into a corresponding connector socket of a data processing device. There may also be a wireless communications integrated circuit that is mounted to the computer expansion board. The integrated circuit may include signal ports connected to respective ones of the connector pins of the computer expansion board, multilink operation input ports, and multilink operation output ports. The wireless networking module may also include a multilink operation input interconnect that is connected to the multilink operation input ports of the wireless communications integrated circuit. The multilink operation input interconnect may be mounted to the computer expansion board and may be separate from the connector pins of the computer expansion board. The wireless networking module may further include a multilink operation output interconnect that is connected to the multilink operation output ports of the wireless communications integrated circuit. The multilink operation output interconnect may be mounted to the computer expansion board and, au be separate from the connector pins of the computer expansion board.

Another embodiment of the present disclosure may be a multilink operation wireless networking system. The system may include a plurality of wireless communications modules. Each of these modules may include a circuit board with connector pins, a wireless communications integrated circuit with signal ports connected to the connector pins, multilink operation input ports and output ports, and multilink operation input interconnects and output interconnects connected to respective multilink operation input ports and output ports. The system may also include one or more multilink operation cables. A first one of the multilink operation cables may be connected to one of the multilink operation output interconnects of a first one of the plurality of wireless communications modules. It may also be connected to one of the multilink operation input interconnects of a second one of the plurality of wireless communications modules.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2A is a top view of a wireless networking module according to an embodiment of the present disclosure;

FIG. 2B is a bottom view of the wireless networking module;

DETAILED DESCRIPTION

The detailed description set forth below in connection with the appended drawings is intended as a description of the several presently contemplated embodiments of a multilink operation wireless networking system and a wireless networking module. They are not intended to represent the only forms in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second, primary and secondary, and the like are used solely to distinguish one from another entity without necessarily requiring or implying any actual such relationships or order between such entities.

Figures 1, 1A:
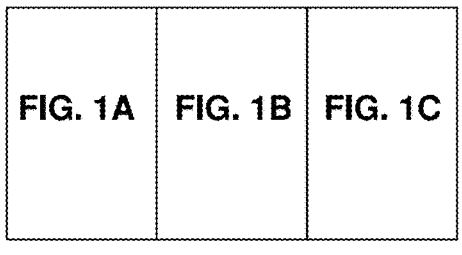
FIG. 1 is a diagram of a wireless networking system with multiple radio modules configured for multilink operation (MLO)
Figure 1B:
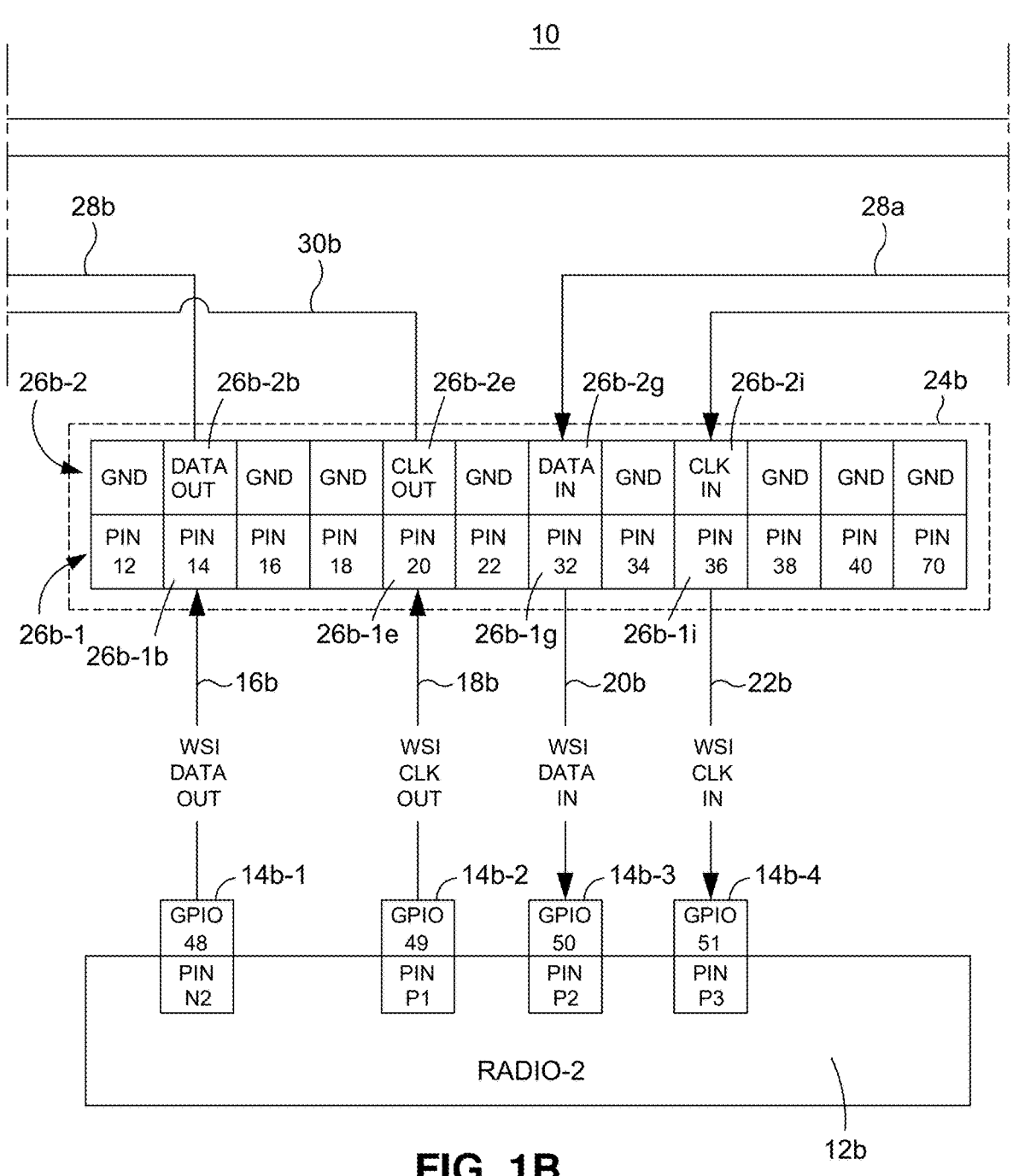
Figure 1C:
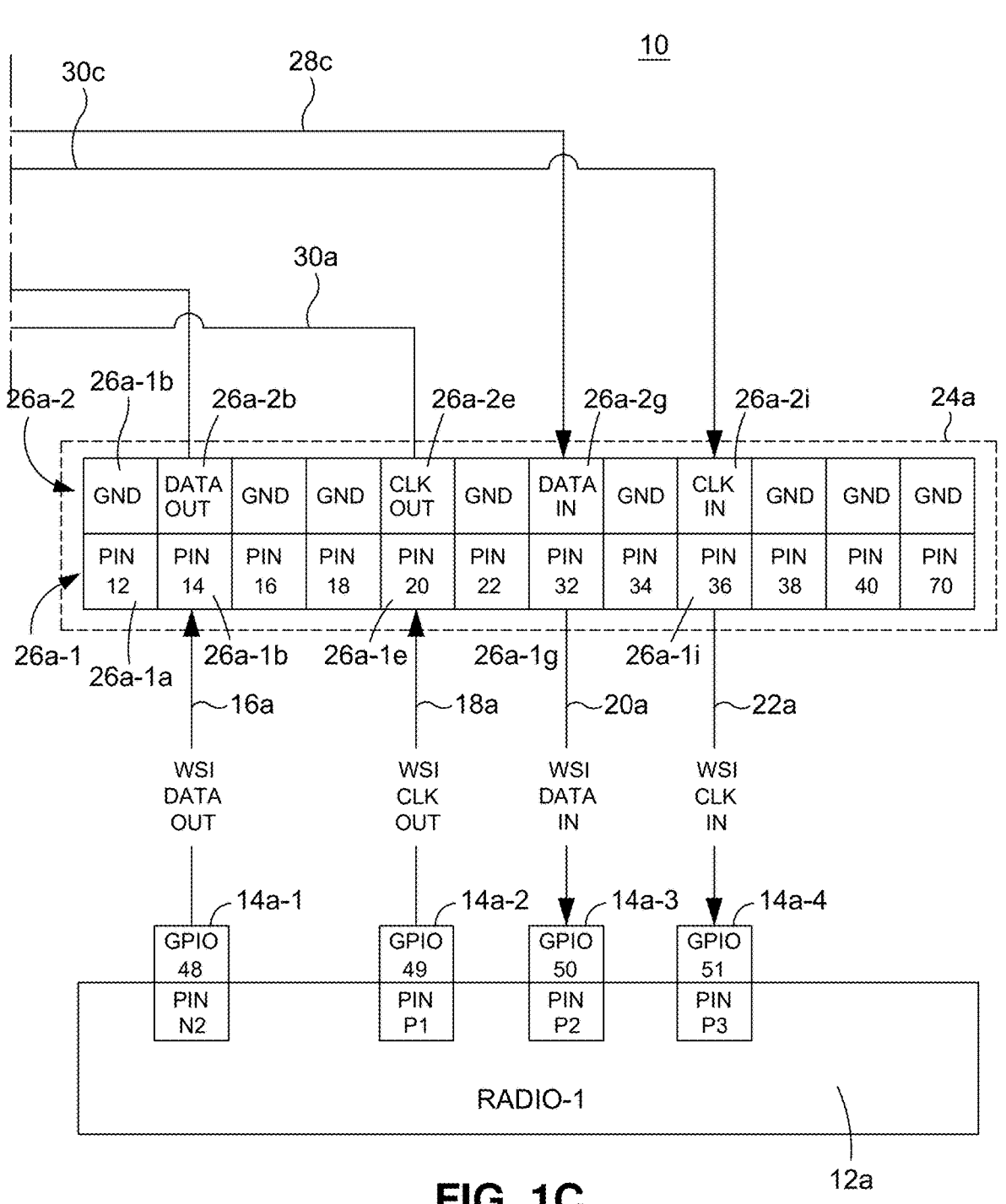

FIG. 1 illustrates one possible implementation of a wireless network system 10 that is multilink operation (MLO)-capable, where multiple radio transceivers operating at different frequency bands carry on simultaneous communications. These multiple, simultaneous communications links allow for the aggregation of throughput across the entire system 10, and transmission can be routed through the least congested link. One standard that specifies MLO is IEEE 802.11be, also referred to as Wi-Fi 7, and the embodiments of the present disclosure are described in the context of such an implementation. It will be appreciated by those having ordinary skill in the art, however, that the contemplated features may be adapted to other wireless network systems that also implement multilink operation. The disclosed specifics to Wi-Fi 7 (such as specific signal lines, pinouts, etc.) are presented by way of example only and not of limitation.

In further detail, the wireless network system 10 includes multiple radio modules, including a first radio module 12$a$, a second radio module 12$b$, and a third radio module 12$c$. Each of the radio modules 12 is understood to be implemented as an integrated circuit with various subcomponents, including a Wi-Fi system-on-chip that implements media access control (MAC) layer functionalities, link layer control (LLC) functionalities, along with a baseband circuit that modulates data onto a radio frequency(RF) carrier wave and amplifies the signal that is transduced by an antenna for transmission to a remote receiver. The baseband integrated circuit also demodulates received RF signals received by the antenna, and extracts the underlying data signal therefrom. Each of the radio modules 12 are capable of operating in the ISM (Industrial-Scientific-Mobile) frequency bands of 2.4 GHz, 5 GHz, and 6 GHz. Because the implementation of radio modules 12 is well-known in the art, no additional details thereof will be described. It is deemed to be within the purview of those having ordinary skill in the art to adopt different configurations of the radio modules 12 for the wireless network system 10.

In an exemplary embodiment, the radio modules 12 each have multiple input and output ports that have specifically designated functions, i.e., carry specific signals. Illustrated for each radio module 12 are four such ports, including general purpose input/output (GPIO) ports 14. It is understood that the radio modules 12 include additional ports, and only those pertinent to the MLO implementation in the context of the Wi-Fi 7 wireless network system 10 are depicted. More particularly, the first radio module 12$a$ includes a GPIO port 14$a$-1 that corresponds to a forty-eighth (48th) one of the first radio module 12$a$ and pin N2 thereof, a GPIO port 14$a$-2 that corresponds to a forty-ninth (49th) one of the first radio module 12$a$ and pin P1 thereof, a GPIO port 14$a$-3 that corresponds to a fiftieth (50th) one of the first radio module 12$a$ and pin P2 thereof, and a GPIO port 14$a$-4 that correspond to a fifty-first (51st) one of the first radio module 12$a$ and pin P3 thereof.

The function, and hence the specific signal that is generated from the GPIO ports 14, are programmable. According to the illustrated embodiment, the GPIO port 14$a$-1 may be programmed to output a WSI data output (WSI DATA OUT) signal 16$a$. The GPIO port 14$a$-2 may be programmed to output a WSI clock output (WSI CLK OUT) signal 18$a$. The GPIO port 14$a$-3 may be programmed to receive a WSI data input (WSI DATA IN) signal 20$a$, while the GPIO port 14$a$-4 may be programmed to receive a WSI clock input (WSI CLK IN) signal 22$a$.

Similarly, the second radio module 12$b$ is configured in the same manner as the first radio module 12$a$. Accordingly, the second radio module 12$b$ has a GPIO port 14$b$-1 corresponding to a forty-eighth (48th) one of the second radio module 12$b$ and pin N2 thereof, a GPIO port 14$b$-2 that corresponds to a forty-ninth (49th) one of the second radio module 12$b$ and pin P1 thereof, a GPIO port 14$b$-3 that corresponds to a fiftieth (50th) one of the second radio module 12$b$ and pin P2 thereof, and a GPIO port 14$b$-4 that correspond to a fifty-first (51st) one of the second radio module 12$b$ and pin P3 thereof. The GPIO port 14$b$-1 may be programmed to output a WSI data output signal 16$b$ (WSI DATA OUT), and the GPIO port 14b-2 may be programmed to output a WSI clock output signal 18b (WSI CLK OUT). The GPIO port 14b-3 may be programmed to receive a WSI data input signal 20b (WSI DATA IN), and the GPIO port 14b-4 may be programmed to receive a WSI clock input signal 22b (WSI CLK IN).

Along these lines, the third radio module 12c is likewise configured in the same manner as the first radio module 12a and the second radio module 12b. Thus, the third radio module 12c has a GPIO port 14c-1 corresponding to a forty-eighth (48th) one of the third radio module 12c and pin N2 thereof, a GPIO port 14c-2 that corresponds to a forty-ninth (49th) one of the third radio module 12c and pin P1 thereof, a GPIO port 14c-3 that corresponds to a fiftieth (50th) one of the third radio module 12c and pin P2 thereof, and a GPIO port 14c-4 that correspond to a fifty-first (51st) one of the third radio module 12c and pin P3 thereof. The GPIO port 14c-1 may be programmed to output a WSI data output signal 16c (WSI DATA OUT), and the GPIO port 14c-2 may be programmed to output a WSI clock output signal 18c (WSI CLK OUT). The GPIO port 14c-3 may be programmed to receive a WSI data input signal 20c (WSI DATA IN), and the GPIO port 14c-4 may be programmed to receive a WSI clock input signal 22c (WSI CLK IN).

The foregoing WSI DATA signals 16, 20 and WSI CLK signals 18, 22 are understood to be used for controlling/coordinating MLO operations among multiple radio modules 12, and is an exemplary implementation of Wi-Fi 7 in a known chipset. One such implementation is one provided by Qualcomm, Inc. These signals and their associated transmission lines may also be referred to as MLO control signals or MLO control signal lines. In the context of Wi-Fi 7 implementations, these signals are high speed single-ended asynchronous data streams. In the exemplary embodiment illustrated in FIG. 1, such MLO control signal lines are interconnected between the first radio module 12a, the second radio module 12b, and the third radio module 12c. That is, with respect to the MLO control signal lines, the radio modules 12 are daisy-chained, where the output of one is connected to the input of another, until the last in the chain is connected back to the first in the chain.

One possible interconnection example is shown in FIG. 1, which utilizes jumper connectors 24 corresponding to each of the radio modules 12. Thus, there is a first jumper connector 24a for the first radio module 12a, a second jumper connector 24b for the second radio module 12b, and a third jumper connector 24c for the third radio module 12c. In the exemplary jumper connectors, there are two rows of ports 26 shorted on a column-wise basis. A pair of ports in a given column are understood to be shorted together. For instance, in the first jumper connector 24a, port 26a-1a (designated as Pin 12) and port 26a-1b (for a ground/GND connection) are shorted together. Further, port 26a-1b (designated as Pin 14) is shorted with the port 26a-2b, and also connected to the GPIO port 14a-1. Thus, the WSI data output signal 16a is present on the port 26a-2b (DATA OUT). Along these lines, the GPIO port 14a-2 is connected to port 26a-1e, with the WSI clock output signal 18a being present on the port 26a-2e (CLK OUT) to which the port 26a-2e is connected. Port 26a-1g (designated Pin 32) is connected to the GPIO port 14a-3, such that the WSI data input signal 20a on the port 26a-2g (DATA IN) is passed to the first radio module 12a. Likewise, port 26a-1i (designated Pin 36) is connected to the GPIO port 14a-4, where the WSI clock input signal 22a from the port 26a-2i (CLK IN) is passed to the first radio module 12a.

The foregoing connections between the first radio module 12a and the first jumper connector 24a are replicated as between the second radio module 12b and the second jumper connector 24b, where certain GPIO ports on the second radio module are connected to the first row connectors 24b-1 of the second jumper connector 24b. The second row connectors 24b-2 are shorted to the corresponding first row connectors 24b-1. That is, port 26b-1b (designated as Pin 14) is shorted with the port 26b-2b, and also connected to the GPIO port 14b-1, with the WSI data output signal 16b being present on the port 26b-2b (DATA OUT). The GPIO port 14b-2 is connected to port 26b-1e, with the WSI clock output signal 18b being present on the port 26b-2e (CLK OUT) to which the port 26b-1e is shorted. Port 26b-1g (designated Pin 32) is connected to the GPIO port 14b-3, such that the WSI data input signal 20b on the port 26b-2g (DATA IN) is passed to the second radio module 12b. Port 26b-1i (designated Pin 36) is connected to the GPIO port 14b-4, where the WSI clock input signal 22b from the port 26b-2i (CLK IN) is passed to the second radio module 12b.

These connections are also replicated as between the third radio module 12c and the third jumper connector 24c, where certain GPIO ports on the third radio module are connected to the first row connectors 24c-1 of the third jumper connector 24c. The second row connectors 24c-2 are shorted to the corresponding first row connectors 24c-1. That is, port 26c-1b (designated as Pin 14) is shorted with the port 26c-2b, and also connected to the GPIO port 14c-1, with the WSI data output signal 16c being present on the port 26c-2b (DATA OUT). The GPIO port 14c-2 is connected to port 26c-1e, with the WSI clock output signal 18c being present on the port 26c-2e (CLK OUT) to which the port 26c-1e is shorted. Port 26c-1g (designated Pin 32) is connected to the GPIO port 14c-3, such that the WSI data input signal 20c on the port 26c-2g (DATA IN) is passed to the third radio module 12c. Port 26c-1i (designated Pin 36) is connected to the GPIO port 14c-4, where the WSI clock input signal 22c from the port 26c-2i (CLK IN) is passed to the third radio module 12c.

Again, the MLO control signal lines are interconnected between the first radio module 12a, the second radio module 12b, and the third radio module 12c. The port 26a-2b of the first jumper connector 24a is connected to the port 26b-2g of the second jumper connector 24b over a first data signal jumper 28a, such that the WSI data output signal 16a (DATA OUT) from the first radio module 12a is passed to the GPIO port 14b-3 (DATA IN) of the second radio module 12b. Similarly, the port 26a-2e of the first jumper connector 24a is connected to the port 26b-2e of the second jumper connector 24b over a first clock signal jumper 30a, such that the WSI clock output signal 18a (CLK OUT) from the first radio module 12a is passed to the GPIO port 14b-4 (CLK IN) of the second radio module 12b.

The port 26b-2b of the second jumper connector 24b is connected to the port 26c-2g of the third jumper connector 24c over a second data signal jumper 28b, such that the WSI data output signal 16b (DATA OUT) from the second radio module 12b is passed to the GPIO port 14c-3 (DATA IN) of the third radio module 12c. Moreover, the port 26b-2e of the second jumper connector 24b is connected to the port 26c-2e of the third jumper connector 24c over a second clock signal jumper 30b, such that the WSI clock output signal 18b (CLK OUT) from the second radio module 12b is passed to the GPIO port 14c-4 (CLK IN) of the third radio module 12c.

As there are no additional radio modules, the third radio module 12c is connected back to the first radio module 12a. The port 26c-2b of the third jumper connector 24c is connected to the port 26a-2g of the first jumper connector 24a over a third data signal jumper 28c, such that the WSI data output signal 16c (DATA OUT) from the third radio module 12c is passed to the GPIO port 14a-3 (DATA IN) of the first radio module 12a. The port 26c-2e of the third jumper connector 24c is connected to the port 26a-2e of the first jumper connector 24a over a third clock signal jumper 30c, such that the WSI clock output signal 18c (CLK OUT) from the third radio module 12c is passed to the GPIO port 14a-4 (CLK IN) of the first radio module 12a.

The foregoing example has been presented for illustrating the logical interconnections of the MLO control signals in a daisy-chain configuration, and the embodiments of the present disclosure need not be limited to the specific physical connections of the radio modules 12 and the jumper connectors 24. FIGS. 2A and 2B depict top and bottom views, respectively, of an exemplary wireless networking module 32 that is adaptable to multilink operation.

The wireless networking module 32 may be implemented as a computer expansion board 34 onto which a wireless communication integrated circuit 36 is mounted. In general, the radio module 12 is understood to correspond to the wireless communication integrated circuit 36, in that in either case, the core functionality of wireless communications is performed. Various traces are routed to individual pins of an edge connector 38 that serves as an interface between the wireless communication integrated circuit 36 and a computer system. The pins of the edge connector 38 are understood to be exposed conductors that are received within a corresponding expansion socket on the computer system, fixed to an underlying substrate of fabricated of suitable material such as FR-4.

According to one embodiment, the computer expansion board 34 may have a miniPCIe form factor with predefined length and width dimensions, as well as predefined edge connector keying patterns and pin functions that are matched with the expansion socket. Alternatively, the computer expansion board 34 may have an M.2 B form factor. Preferably, though optionally, the edge connector 38 an M.2 E-key connector. The form factor of the wireless networking module 32, including the computer expansion board 34 and the edge connector 38 thereof may vary without departing from the scope of the present disclosure.

As indicated above, some of the ports of the wireless communication integrated circuit 36 are routed to the pins of the edge connector 38. However, according to various embodiments of the present disclosure, the MLO control signal lines are routed to separate interconnects. Specifically, there is an MLO input interconnect 40 and an MLO output interconnect 42, positioned on opposite sides of the computer expansion board 34. The opening or accessway of the MLO input interconnect 40 for a connecting cable faces a left edge 35a of the computer expansion board 34, while the opening or accessway of the MLO output interconnect 42 faces a right edge 35b of the computer expansion board 34.

Figure 3:
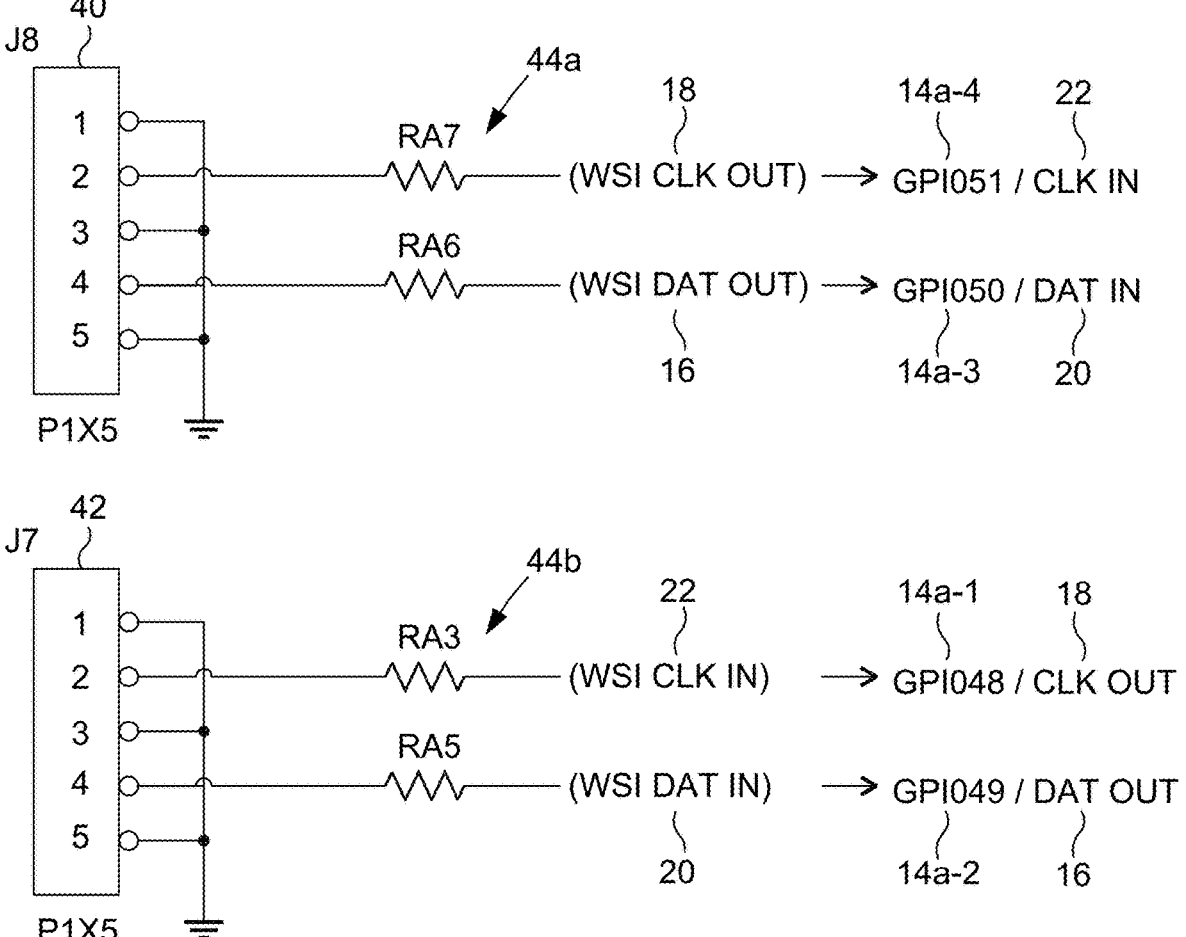
FIG. 3 is a wiring diagram of a multilink operation input interconnect and output interconnect.

With reference to FIG. 3, the MLO input interconnect 40 may have five (5) pins. Pin 2 may be connected to the GPIO port 14a-4 that is designated for the WSI clock input signal 22 (CLK IN), which is arriving to the MLO input interconnect 40 as the WSI clock output signal 18. Thus, pin 2 may also be referred to as a clock signal connector. Pin 4 may be connected to the GPIO port 14a-3 that is designated for the WSI data input signal 20 (DAT IN) and arriving to the MLO input interconnect 40 as the WSI data output signal 16. Pin 4 may accordingly be referred to as a data signal connector. The pins surrounding the control line inputs, e.g., pin 1, pin 3, and pin 5, may be tied to ground. The signal transmission path between the MLO input interconnect and the wireless communication integrated circuit 36 include impedance matching circuits 44a. In one embodiment, a resistor RA7 is connected in series between pin 2 of the MLO input interconnect 40 and the GPIO port 14a-4, while a resistor RA6 is connected in series between pin 4 of the MLO input interconnect 40 and the GPIO port 14a-3. There may be an inductive component to the resistors RA6 and RA7, or additional passive components (inductors, capacitors) may be incorporated into the impedance matching circuits 44a.

The MLO output interconnect 42 may also have five (5) pins. Pin 2 may be connected to the GPIO port 14a-1 that is designated for the WSI clock output signal 18 (CLK OUT), which is transmitted from the MLO output interconnect 42 as the WSI clock input signal 22. Pin 4 may be connected to the GPIO port 14a-2 that is designated for the WSI data output signal 16 (DAT OUT) and transmitted from the MLO output interconnect 42 as the WSI data input signal 22 to the other wireless networking module 32. The pins surrounding the control line inputs, e.g., pin 1, pin 3, and pin 5, may be tied to ground. The signal transmission path between the MLO input interconnect and the wireless communication integrated circuit 36 include impedance matching circuits 44b. A resistor RA3 is connected in series between pin 2 of the MLO output interconnect 42 and the GPIO port 14a-1, and a resistor RA5 is connected in series between pin 4 of the MLO output interconnect 42 and the GPIO port 14a-2. There may be an inductive component to the resistors RA3 and RA5, or additional passive components may be included.

Figures 4, 5, 6:
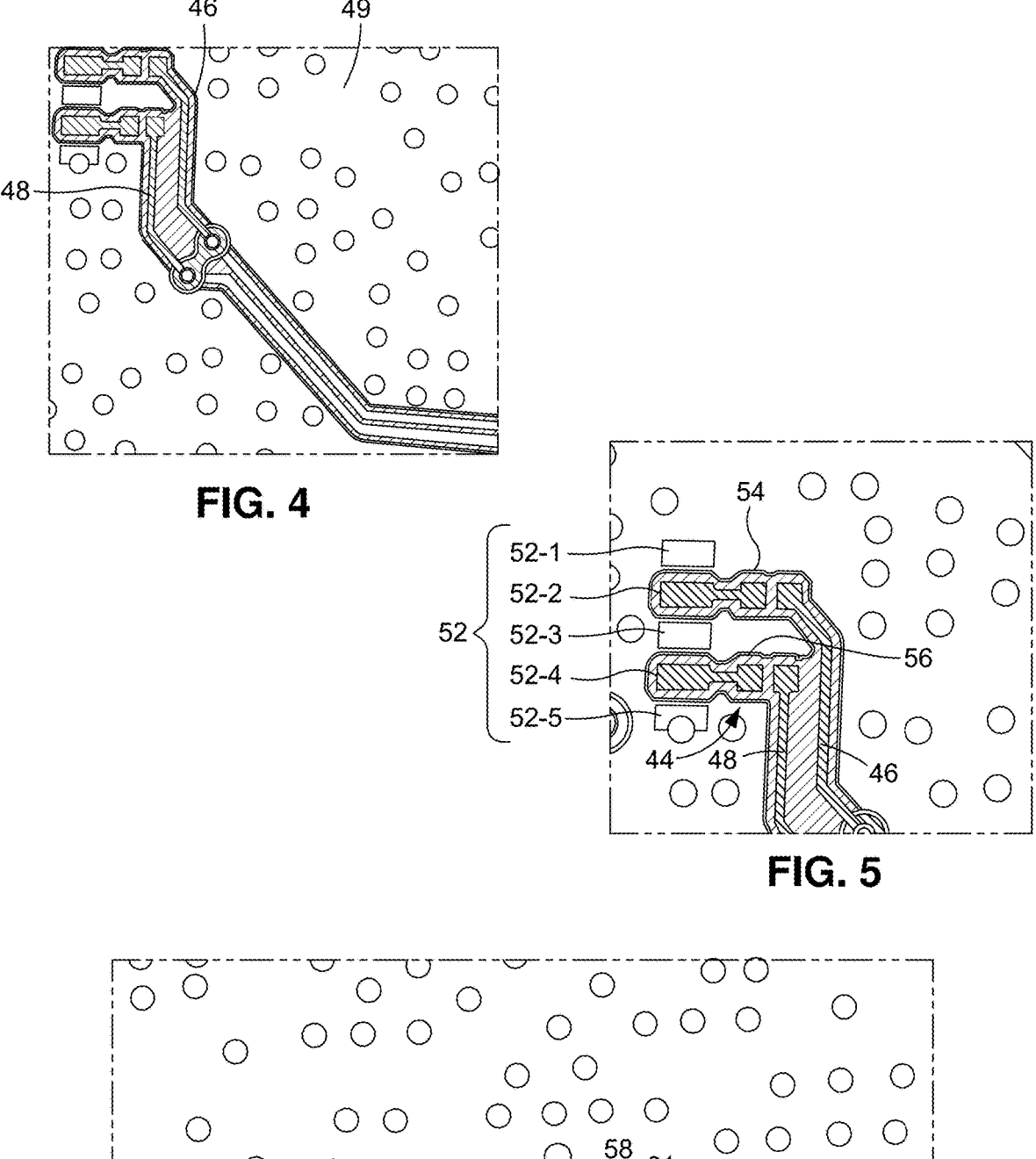
FIG. 4 is a plan view of a printed circuit board for the wireless networking module with traces for multilink operation transmission lines.
FIG. 5 is a detailed plan view of the printed circuit board showing the conductive pads for mounting the multilink operation interconnects and peripheral components and traces.
FIG. 6 is a detailed plan view of the printed circuit board showing shielding vias.

As the MLO control signals are high speed data streams, the embodiments of the present disclosure contemplate additional isolation measures and ground protection on the printed circuit board of the computer expansion board 34. FIG. 4 is a detailed view of computer expansion board 34 with a first conductive trace 46 and a second conductive trace 48 layered onto a substrate 49. As further illustrated in FIG. 5, there are five conductive pads 50 corresponding to the five pins of the aforementioned MLO interconnects 40, 42, including a first conductive pad 52-1 that is tied to ground, a second conductive pad 52-2 connected to the first conductive trace 46, a third conductive pad 52-3 tied to ground, a fourth conductive pad 52-4 connected to the second conductive trace 48, and a fifth conductive pad 52-5 tied to ground. The components of a first one of the impedance matching circuits 44 may be attached across a set of conductive pads 54, while the components of a second one of the impedance matching circuits 44 may be attached across another set of conductive pads 56. With additional reference to FIG. 6, the vias 58 on the printed circuit board include additional ground protection measures to shield against crosstalk to the power supply circuit and other electrically noisy components. In further detail, the crosstalk of the WSI signal to the power supply results in electromagnetic interference (EMI) emissions. To this end, WSI traces 59, including the vias 58, incorporate ground shielding 61. Additionally, the ground plane for the MLO control signal circuitry are isolated from other circuits and layers.

Figures 7A, 7B:
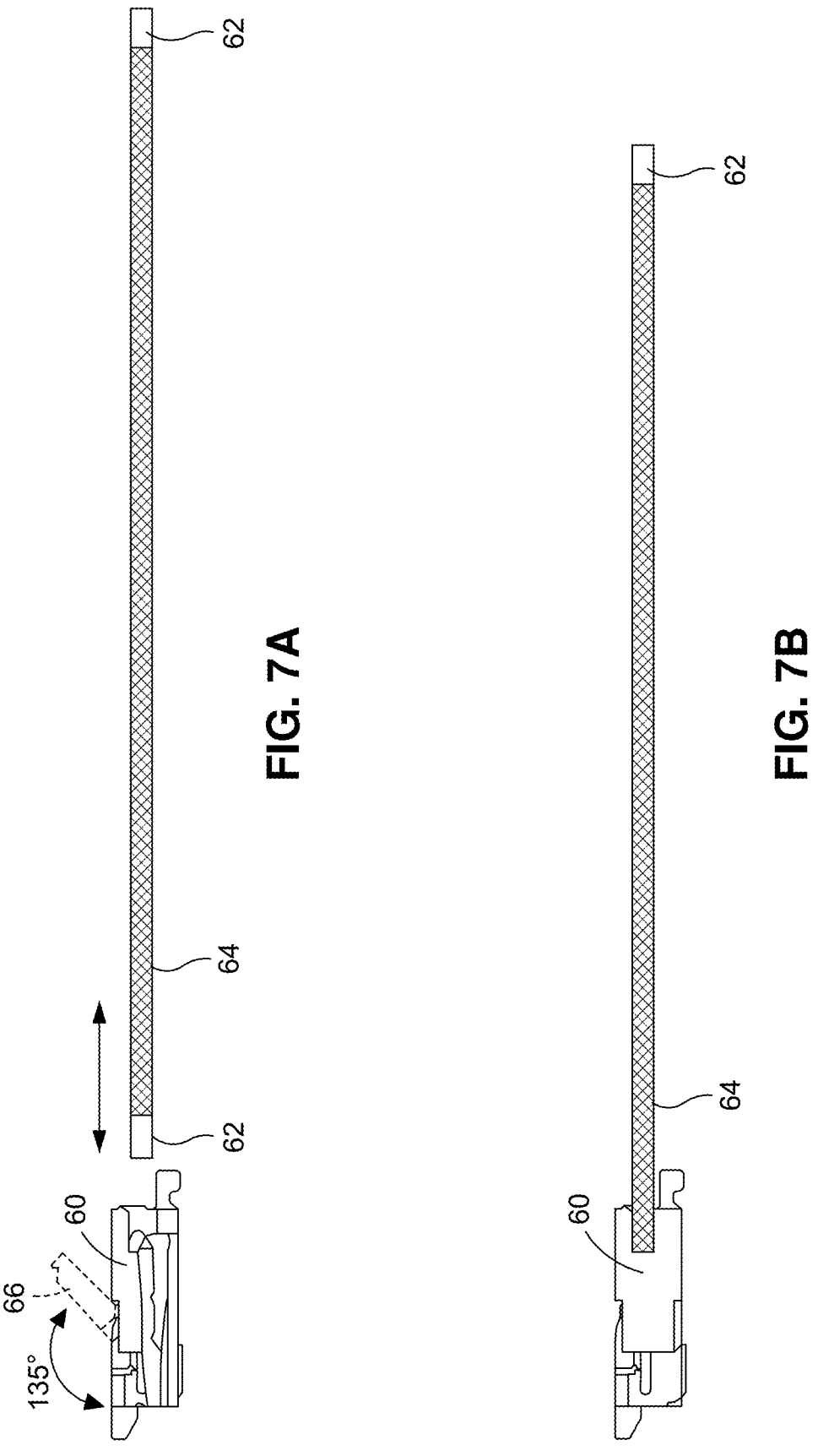
FIGS. 7A and 7B illustrate multilink operation interconnects and cables according to an embodiment of the present disclosure.

Referring additionally to FIGS. 7A and 7B, one embodiment of the present disclosure utilizes a cable connector 60 that is mounted to the printed circuit board of the computer expansion board 34. The cable connector 60 is understood to include pins that form an electrical connection to exposed conductors 62 of a cable 64. The exposed conductors 62 are inserted into the cable connector 60, and a latch 66 is rotated into compressive retention against the cable 64. FIG. 7A in particular shows the cable 64 separated from cable connector 60, while FIG. 7B illustrates the cable 64 inserted and retained in the cable connector 60. The particular mechanical features of the cable connector 60 are presented by way of example only and not of limitation, and any other suitable cable connector may be substituted without departing from the scope of the present disclosure.

Figures 8A, 8B, 8C:
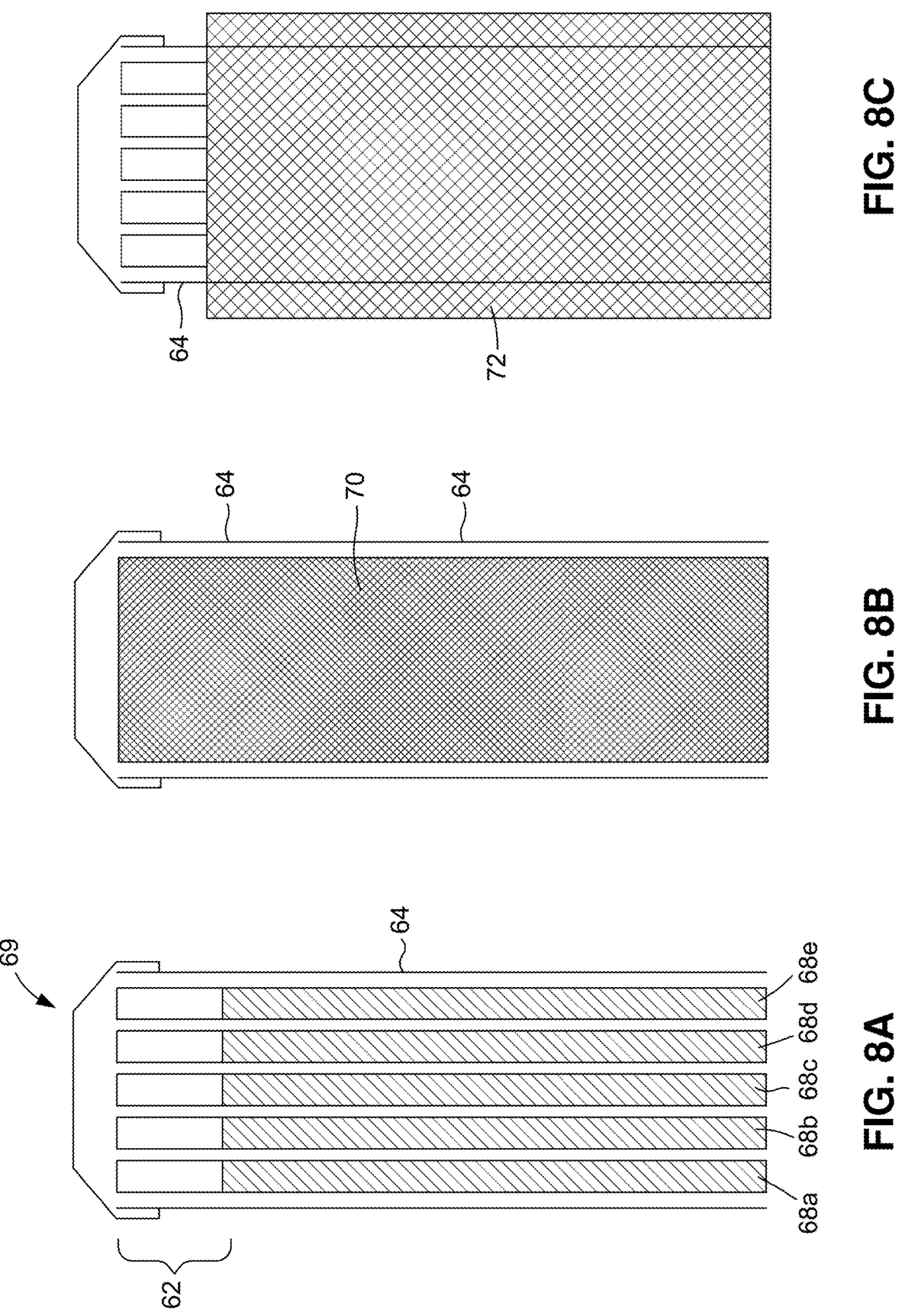
FIGS. 8A, 8B, and 8C show a top layer, a bottom layer, and shielding, respectively, of the multilink operation cable.

FIGS. 8A-8C illustrate additional details of the cable 64. FIG. 8A shows five separate transmission lines 68, including a first transmission line 68*a*, a second transmission line 68*b*, a third transmission line 68*c*, a fourth transmission line 68*d*, and a fifth transmission line 68*e* that are arranged side-by-side in a flat cable arrangement. The functions of each of the transmission lines 68 are understood to correspond to the MLO interconnects 40, 42 discussed above, with the first transmission line 68*a* being connectible to pin 1 and to ground, the second transmission line 68*b* being connectible to pin 2 (CLK OUT 18 or CLK IN 22), the third transmission line 68*c* being connectible to pin 3 and to ground, the fourth transmission line 68*d* being connectible to pin 4 (DAT OUT 16 or DAT IN 20), and the fifth transmission line 68*e* being connectible to pin 5 and to ground. Thus, the ground lines of the first, third, and fifth transmission lines 68*a*, 68*c*, 68*e* are interlaced with the MLO control signal lines of the second and fourth transmission lines 68*b*, 68*d*. Because the transmission lines 68 are not impedance matched to the MLO/WSI signals, the aforementioned impedance matching circuits 44 are included. In embodiments where each of the transmission lines 68 are encapsulated within a cladding, the tip end 69 define the exposed conductors 62. FIG. 8B shows a bottom layer of the cable 64 with a ground strip 70 that provide additional shielding for the transmission lines 68*b*, 68*d*. As best shown in FIG. 8C, the cable 64 is provided with a shielding mesh 72 surrounding a cable body defined by the combination of the transmission lines 68 and the ground strip 70.

The particulars shown herein are by way of example and for purposes of illustrative discussion of the embodiments of a multilink operation wireless networking system and a wireless networking module and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A wireless networking module for multilink operation, comprising:

a computer expansion board with connector pins in a predefined arrangement insertable into a corresponding connector socket of a data processing device;

a wireless communications integrated circuit mounted to the computer expansion board and including signal ports connected to respective ones of the connector pins of the computer expansion board, multilink operation input ports, and multilink operation output ports;

a multilink operation input interconnect connected to the multilink operation input ports of the wireless communications integrated circuit, the multilink operation input interconnect being mounted to the computer expansion board and separate from the connector pins of the computer expansion board; and a multilink operation output interconnect connected to the multilink operation output ports of the wireless communications integrated circuit, the multilink operation output interconnect being mounted to the computer expansion board and separate from the connector pins of the computer expansion board.

2. The wireless networking module of claim 1, wherein the multilink operation input interconnect and the multilink operation output interconnect each include a clock signal connector and a data signal connector.

3. The wireless networking module of claim 2, wherein the clock signal connectors and the data signal connectors of the multilink operation input interconnect and the multilink operation output interconnect are each surrounded by a ground connector tied to ground.

4. The wireless networking module of claim 2, further comprising impedance matching circuits connected to each of the clock signal connectors and the data signal connectors.

5. The wireless networking module of claim 1, wherein the multilink operation output interconnect is positioned along a first edge of the computer expansion board and the multilink operation input interconnect is positioned along a second edge of the computer expansion board opposite the first edge.

6. The wireless networking module of claim 1, wherein the computer expansion board defines one or more shielding vias adjacent to signal transmission lines between the multilink operation input ports and the multilink operation output ports to respective multilink operation input interconnects and multilink operation output interconnects.

7. The wireless networking module of claim 1, wherein the computer expansion board has a miniPCIe form factor.

8. The wireless networking module of claim 1, wherein the computer expansion board has a M.2 B form factor.

9. A multilink operation wireless networking system, comprising:

a plurality of wireless communications modules each including a circuit board with connector pins, a wireless communications integrated circuit with signal ports connected to the connector pins, multilink operation input ports and output ports, and multilink operation input interconnects and output interconnects connected to respective multilink operation input ports and output ports; and one or more multilink operation cables, a first one of the multilink operation cables being connected to one of the multilink operation output interconnects of a first one of the plurality of wireless communications modules and to one of the multilink operation input interconnects of a second one of the plurality of wireless communications modules.

10. The system of claim 9, wherein:

the multilink operation input interconnects and the output interconnects each include a clock signal connector and a data signal connector; and the one or more multilink operation cables each include a clock signal line and a data signal line.

11. The system of claim 10, wherein:

the clock signal connectors and the data signal connectors of the multilink operation input interconnects and output interconnects interconnect are each surrounded by a ground connector tied to ground; and the one or more multilink operation cables each include ground lines interlacing the clock signal line and the data signal line.

12. The system of claim 11, wherein the one or more multilink operation cables has a flat configuration with each of the clock signal line, the data signal line, and the ground lines are arranged side-by-side.

13. The system of claim 11, wherein the one or more multilink operation cables each further include a grounding strip backing affixed to the clock signal line, the data signal line, and the ground lines.

14. The system of claim 13, wherein the one or more multilink operation cables each further include a shielding mesh surrounding an assembly of the clock signal line, the data signal line, the ground lines, and the grounding strip backing.

15. The system of claim 10, wherein the one or more multilink operation cables each include exposed conductive terminations for the clock signal line, the data signal line, and the ground lines.

16. The system of claim 15, wherein the exposed conductive terminals of the clock signal line, the data signal line, and the ground lines are insertable into the respective clock signal connector, the data signal connector, and the ground connector of a given one of the multilink operation input interconnects or output interconnects to establish electrical continuity therewith.

17. The system of claim 16, wherein the multilink operation input interconnects and output interconnects each include a cable retention clip.

18. The system of claim 10, further comprising impedance matching circuits connected to each of the clock signal connectors and the data signal connectors of each of the multilink operation input interconnects and the output interconnects.

19. The system of claim 9, wherein one of the multilink operation input interconnects and one of the output interconnects of a given one the wireless communications modules is mounted to a corresponding one of the circuit boards.

20. The system of claim 19, wherein the one of the multilink operation input interconnects is positioned along a first edge of the corresponding one of the circuit boards and the one of the multilink operation output interconnects is positioned along a second edge of the corresponding one of the circuit boards opposite the first edge.

* * * * *